United States Patent [19]

Shi et al.

[11] Patent Number: 5,972,832
[45] Date of Patent: Oct. 26, 1999

[54] DISTILLATE HYDROCRACKING CATALYST AND PROCESS FOR THE PREPARATION OF THE SAME

[75] Inventors: Jianwen Shi; Hong Nie; Yahua Shi; Yulin Shi; Yanping Zhang; Dadong Li, all of Beijing, China

[73] Assignees: Research Institute of Petroleum Proc., Geijing; China Petrochemical Corporation, Beijing, both of China

[21] Appl. No.: 08/884,815

[22] Filed: Jun. 30, 1997

[30] Foreign Application Priority Data

Jun. 28, 1996 [CN] China ................................ 96106587

[51] Int. Cl.$^6$ ........................... B01J 23/40; B01J 29/06; B01J 27/06; B01J 21/08
[52] U.S. Cl. ........................ 502/327; 502/335; 502/337; 502/305; 502/315; 502/64; 502/65; 502/74; 502/78; 502/79; 502/224; 502/228; 502/229; 502/254; 502/258; 502/259
[58] Field of Search ................................ 502/64, 65, 74, 502/78, 79, 224, 228, 229, 254, 258, 259, 305, 313, 314, 315, 325, 327, 335, 337; 208/110–112, 115, 123, 124

[56] References Cited

U.S. PATENT DOCUMENTS

| | | | |
|---|---|---|---|
| 2,847,358 | 8/1958 | Kemp et al. | 208/124 |
| 3,132,089 | 5/1964 | Hass et al. | 208/89 |
| 3,159,568 | 12/1964 | Price et al. | 208/89 |
| 3,872,029 | 3/1975 | Takase et al. | 502/66 |
| 4,138,326 | 2/1979 | Swift et al. | 502/66 |
| 4,175,033 | 11/1979 | Hilfman | 502/228 |
| 4,367,164 | 1/1983 | Shiroto et al. | 502/84 |
| 4,401,556 | 8/1983 | Bezman et al. | 208/111 |
| 4,419,271 | 12/1983 | Ward | 502/65 |
| 4,483,942 | 11/1984 | Sekido et al. | 502/257 |
| 4,517,073 | 5/1985 | Ward et al. | 208/111 |
| 4,563,434 | 1/1986 | Ward et al. | 502/66 |
| 4,576,711 | 3/1986 | Ward et al. | 502/66 |
| 4,618,594 | 10/1986 | Tait et al. | 502/204 |
| 4,672,048 | 6/1987 | Ward | 502/66 |
| 4,766,099 | 8/1988 | Dufresne et al. | 502/72 |
| 4,816,538 | 3/1989 | Abdo | 502/257 |
| 4,844,792 | 7/1989 | Abdo et al. | 208/111 |
| 4,891,127 | 1/1990 | Murrel et al. | 208/123 |
| 4,894,142 | 1/1990 | Steigleder | 208/111 |
| 4,957,895 | 9/1990 | Nebesh et al. | 502/228 |
| 5,378,671 | 1/1995 | Keville et al. | 502/64 |
| 5,506,182 | 4/1996 | Yamagishi et al. | 502/64 |

FOREIGN PATENT DOCUMENTS

| | | |
|---|---|---|
| 85100218 | 3/1987 | China . |
| 901026484 | 11/1991 | China . |

OTHER PUBLICATIONS

English Translation of Abstract of CN 85100218B.
English Translation of Abstract of CN 901022648.4.
Search Report (in Chinese) on PCT/CN97/00063.

*Primary Examiner*—Mark L. Bell
*Assistant Examiner*—Patricia L. Hailey
*Attorney, Agent, or Firm*—Ladas & Parry

[57] ABSTRACT

The present invention relates to a hydrocracking catalyst containing nickel, tungsten, fluorine, zeolite as well as alumina, said catalyst is composed of, based on the total weight of the catalyst, 0.5–5.0 wt % fluorine, 2.5–6.0 wt % nickel oxide, 10–38 wt % tungsten oxide, and a catalyst carrier. Said carrier is composed of 20–90 wt % alumina and 10–90 wt % zeolite wherein the zeolite is mesopore or macropore zeolite of an acidity strength value 1.0–2.0 mmol/g determined by $NH_3$-TPD, the alumina is the alumina of an acidity strength value 0.5–0.8 mmol/g determined by $NH_3$-TPD. Said catalyst possesses good desulfurization activity, denitrogenation activity, and higher selectivity with respect to middle distillates than that of the prior art.

12 Claims, No Drawings

DISTILLATE HYDROCRACKING CATALYST AND PROCESS FOR THE PREPARATION OF THE SAME

FIELD OF THE INVENTION

The present invention relates to a distillate hydrocracking catalyst. More particularly, the present invention relates to a hydrocracking catalyst containing nickel, tungsten and zeolite.

BACKGROUND OF THE INVENTION

In recent years, the tendency of crude oil becoming heavier and worse is growing more significant day after day world wide. Meanwhile, the demand for middle distillates is continuously increasing. These lead to a rapid development of the hydrocracking technique for the purpose of the bettering ad the lightening of heavy distillate, while the hydrocracking catalyst is one of the most important and critical factors of the hydrocracking technique.

Hydrocracking catalyst is a bifunctional catalyst which possesses at the same time the cracking activity and hydrogenation activity. In other words, hydrocracking catalyst contains at the same time acidic component and hydrogenation component. The acidic component is mainly the refractory inorganic oxide and/or various zeolites, and the hydrogenation component is generally selected from the oxides of the metals selected from Group VIB or Group VIII of the Periodic Table. In order to obtain different hydrocracking products, it is required to regulate the cracking activity and the hydrogenation activity of the catalyst. Generally speaking, the hydrocracking catalyst ought to possess good performances of desulfurization, denitrogenation and hydrogenation for aromatic compounds. The catalyst used for producing middle distillates should further possess high selectivity to middle distillates and nitrogen resistant stability. In general, the selectivity and the nitrogen resistant stability of the hydrocracking catalyst re raised by means of regulating the acidity of the catalyst.

Chinese patent application No. CN 90102649.4 discloses a hydrogenation catalyst. Said catalyst contains 0.5–5.0 wt % fluorine, 2.5–6.0 wt % nickel oxide, 10–32 wt % tungsten oxide, mordenite having silica to alumina ratio of 9.5–10.5 or Y-type zeolite having silica to alumina a ratio of 4.5–5.5, as well as alumina. Said alumina is prepared by calcining hydrated alumina which is obtained by hydrolysis of alkoxy aluminum. The boehmite content of the alumina is greater than 65 wt %. Although said catalyst possesses high hydrogenation activity and cracking activity, it is merely used for producing raw materials for steam cracking process, while not suitable for producing middle distillates, and the cost of its carrier is rather high.

U.S. Pat. No. 4,894,142 discloses a mid-barrel or distillate hydrocracking process, wherein a catalyst containing metal components selected from Group VIB and Group VIII of the Periodic Table, refractory inorganic oxide and a Y-type zeolite is used. Said Y-type zeolite has a unit cell size of 24.20–24.40 Angstroms, the ion exchange capacity greater than 0.07 and tie acidity strength value determined by $NH_3$-TPD less than 2.00.

In addition, U.S. Pat. No. 4,419,271, U.S. Pat. No. 4,401,556 as well as U.S. Pat. No. 4,517,073 also disclose respectively hydrocarbon conversion catalysts or hydrocracking catalysts, characterized in that the Y-type zeolite possessing certain specific silica to alumina ratio and modified by various methods is used therein.

One of the objects of the present invention is to provide a hydrocracking catalyst which is suitable fo producing middle distillates and has high nitrogen resistant stability.

The other object of the present invention is to provide a process for the preparation of such hydrocracking catalyst.

As is indicated above, the selectivity to middle distillates and the nitrogen resistant stability of the hydrocracking catalyst are enhanced usually by means of regulating the acidity of the catalyst In accordance with the prior art the acidity of the catalyst is regulated mainly by means of changing the species, the content, or the properties of the zeolite used for the carrier of the catalyst. The inventors of the present invention found that a hydrocracking catalyst possessing high selectivity to middle distillates and excellent nitrogen resistant stability can be obtained by means of selecting the alumina and the zeolite of adequate acidities for the preparation of the carrier for the hydrocracking catalyst, i.e., the alumina possessing specific acidity strength value is made to be matched with the zeolite of a specific acidity strength value.

SUMMARY OF THE INVENTION

The catalyst provided by the present invention is composed of 0.5–5.0 wt % fluorine, 2.5–6.0 wt % nickel oxide, 10–38 wt % tungsten oxide and a carrier. Said carrier is composed of 20–90 wt % alumina and 10–80 wt % zeolite wherein the zeolite is mesopore or macropore zeolite and has acidity strength value of 1.0–2.0 mmol/g, and the alumina is an alumina having acidity strength value of 0.5–0.8 mmol/g. Said acidity strength value is determined by $NH_3$-TPD.

The process for the preparation of the catalyst provided by the present invention comprises mixing homogeneously an alumina precursor and a zeolite in a predetermined ratio, shaping, drying and calcining, to obtain catalyst carrier, then impregnating said carrier sequentially with fluorine-containing aqueous solution and nickel-tungsten-containing aqueous solution, and drying and calcining after being impregnated each time. Wherein said alumina precursor is hydrated alumina which can form, after being calcined at 500–650° C. for 2–8 hours, alumina of an acidity strength value of 0.5–0.8 mmol/g determined by $NH_3$-TPD, and said zeolite is a mesopore or macropore zeolite with an acidity strength value of 1.0–2.0 mmol/g determined by $NH_3$-TPD. Said hydrated alia and zeolite are mixed in such a ratio that contents of alumina and zeolite are respectively 20–90 wt % and 10–80 wt % in the catalyst carrier after being calcined at 500–650° C. for 3–5 hours.

DETAILED DESCRIPTION OF THE INVENTION

The catalyst provided by tie present invention is composed of, based on the tot weight of the entire catalyst, 0.5–5.0 wt % fluorine, 2.5–6.0 wt % nickel oxide and 10–38 wt % tungsten oxide loaded on a catalyst carrier. Said catalyst carrier is composed of 20–90 wt % alumina and 10–80 wt % zeolite wherein the zeolite is mesopore or macropore zeolite with acidity strength value of 1.0–2.0 mmol/g determined by $NH_3$-TPD, and the alumina is alumina having acidity strength value of 0.5–0.8 mmol/g determined by $NH_3$-TPD.

In the above-mentioned catalytically active components, fluorine is preferably 1.0–4.0 wt %, nickel oxide is preferably 2.6–5.0 wt %, and tungsten oxide is preferably 19–25 wt %, on the basis of the total weight of the entire catalyst. In the above-mentioned catalyst carrier, alumina is preferably 50–80 wt %, and zeolite is preferably 20–50 wt %.

The process for thee preparation of the catalyst of the present invention reads as follows.

(1) Preparation of catalyst carrier

Hydrated alumina and zeolite are used for the preparation of the catalyst carrier of the present invention. According to the present invention, hydrated alumina which can form alumina of an acidity strength value of 0.5–0.8 mmol/g after being calcined under certain conditions is used. The calcining temperature is 500–650° C., the calcining time duration is 2–8 hours or longer. Alumina obtained by calcining hydrated alumina under such conditions has a pore volume preferably of greater than 0.3 ml/g and a specific surface area preferably of greater than 200 m²/g.

The term "acidity strength value" used in the present application refers to the acidity strength value determined by ammonia temperature programmed desorption ($NH_3$-TPD). The specific determining steps run as follows.

A small amount of the sample to be tested is taken and put into a thermogravimetric analyser; and high pure nitrogen gas flow is introduced. The weight of the sample is measured after the temperature is increased to 500° C. and the weight $W_1$ of the sample is recorded. Then the temperature is decreased to 150° C. and high pure ammonia gas is introduced until there appears an adsorption equilibrium. The temperature is kept constant for one hour so as to remove the ammonia gas physically adsorbed, then tile weight $W_2$ of the sample after ammonia adsorption is recorded. Then the temperature is increased to 500° C. at a programmed temperature rap of 10° C./minute, the weight loss curve is recorded, and the weight $W_3$ of the sample after removal of ammonia is recorded. Acidity strength value of the sample is calculated out by the following formula:

$$\text{Acidity Strength Value} = \frac{W_2(\text{mg}) - W_3(\text{mg})}{W_1(\text{g}) \times \text{molecular weight of ammonia}} (\text{mmol}/\text{g})$$

wherein thermogravimetric analyser may use, e.g., the 951 thermogravimetric analyser of the 9900 thermal analysis system made by Du Pont Corporation.

The hydrated alumina used in the present invention can be prepared by sodium meta-aluminate-carbon dioxide process, alkyl aluminum or alkoxy aluminum hydrolysis process, or sodium meta-aluminate-aluminum sulfate process.

For example, the hydrated alumna used for the present invention can be prepared by the lower carbon alkoxy-aluminum hydrolysis process disclosed in Chinese patent CN 85100218B. Specifically, $C_1$–$C_4$ alkoxy aluminum, preferably aluminum isopropoxide, and lower carbon alcohol with a water content less than 20 wt %, preferably 4–15 wt %, such as water-containing isopropyl alcohol react at 5–120° C. for 1–96 hours, preferably 1–16 hours under the condition of a water amount controlled to be approaching but not greater than the water amount stoichiometrically required for the lower carbon alkoxy aluminum hydrolysis. Then the lower carbon alcohol containing less than 0.2 wt % water is evaporated out. Then deionized water is added to the solid product for aging at 5–100° C. for 1–120 hours preferably at 78–100° C. for 6–40 hours and then water-containing isopropyl alcohol is evaporated out. The solid product thus obtained is dried at 110–120° C. and the hydrated alumina used for the present invention is readily obtained.

The hydrated alumina preferable for the present invention is the hydrated alumina with a boehmite content greater than 60 wt %.

The zeolite used for the present invention is mesopore or macropore zeolite with an acidity strength value of 1.0–2.0 mmol/g determined by $NH_3$-TPD. Such zeolite can be selected from the group of faujasite, mordenite, ZSM-5 zeolite, Beta zeolite and Ω zeolite. Said zeolite can be modified using various methods, such as ion exchange, impregnation etc. The preferable zeolite is hydrogen form Y-type zeolite or rare earth form Y-type zeolite or mordenite.

According to the present invention, a hydrated alumina selected according to the above standard and a zeolite selected according to the above standard are homogeneously mixed in a predetermined ratio, shaped, dried and calcined to readily obtain the catalyst carrier.

For the present invention, it is possible to mix a hydrated alumina selected according to the above standard with a zeolite selected according to the above standards or to mix several kinds of the hydrated alumina selected according to the above standard with several kinds of the zeolite selected according to the above standard.

According to the present invention, the hydrated alumina and the zeolite should be mixed under such a condition that after hydrated alumina and zeolite are mixed, shaped, dried and calcined, the content of alumina is 20–90 wt %, preferably 50–80 wt % of the entire catalyst carrier.

The shaping method is a conventional method in the art such as tabletting, balling or extruding etc. The present invention selects preferably the extruding method.

The calcining temperature indicated above is 500–650° C., and the calcining time duration is 3–5 hours or longer.

(2) Loading of active components

According to the present invention, fluorine, nickel oxide and tungsten oxide should be loaded on the carrier obtained by the above-described process.

The loading of fluorine may use conventional impregnation method i.e., the carrier is impregnated with a predetermined amount of fluorine-containing aqueous solution, and is then dried and calcined. Said fluorine-containing aqueous solution refers to the aqueous solution of fluorine-containing inorganic compound, such as ammonium fluoride and/or hydrogen fluoride. The drying is carried out generally at 100–130° C. and then the calcining is carried out at 400–500° C. for 3–5 hours.

The amount of fluorine loaded on the carrier is generally 0.5–5.0 wt % of the entire catalyst, preferably 1.0–4.0 wt %.

The loading of nickel-tungsten may also use conventional impregnation method, i.e., the fluorine-containing carrier obtained according to the method described above is impregnated with a nickel-tungsten-containing aqueous solution, then is dried and calcined. Said nickel-tungsten-containing aqueous solution is generally an aqueous solution of ammonium meta-tungstate, ammonium tungstate, ammonium ethyl meta-tungstate or nickel meta-tungstate and nickel nitrate or nickel acetate. The nickel-tungsten-containing aqueous solution should be in such a concentration that the contents of nickel and tungsten in the catalyst obtained reach required values. The drying is generally carried out at 100–130° C. and the calcining is carried out at 400–500° C. for 3–5 hours.

The amount of nickel loaded on the carrier should be made to have the nickel oxide occupying 2.5–6.0 wt % of the entire catalyst preferably 2.6–5.0 wt %. The amount of tungsten loaded on the carrier should be made to have the tungsten oxide occupying 10–38 wt % of the entire catalyst, preferably 19–25 wt %.

The catalyst of the present invention can be used under the conventional hydrocracking conditions. Before its use, it can be pre-sulfided using conventional process.

The catalyst of the present invention is suitable for hydrocracking of hydrocarbon feedstock to produce distillates of lower boiling point and lower molecular weight. The hydrocarbon feedstock can be various heavy mineral oils or synthesized oils or their distillates such as straight run gas oils, vacuum gas oils, demetallized oils, atmospheric residue, deasphalted vacuum residue, coker distillates, catalytic cracker distillates, shale oil, tar sand oil, coal liquid etc. The catalyst provided by the present invention is particularly suitable for hydrocracking of heavy or inferior distillate to produce middle distillates having boiling range of 149–371° C., especially 180–370° C. The catalyst provided by the present invention can, when it is used together with hydrofining catalyst, be used for the hydrofining of distillate, especially the medium pressure hydrofining. The nitrogen content in the said distillate feedstock may reach 1500 ppm and the sulfur content nay reach 3.5 wt %.

The catalyst provided by the present invention can, when it is used for hydrocracking of distillates, be used under the conventional hydrocracking conditions, for example, the reaction temperature 200–650° C., preferably 300–510° C. the reaction pressure 3–24 MPa, preferably 4–15 MPa LHSV 0.1–10 hr$^{-1}$, preferably 0.2–5 hr$^{-1}$, hydrogen/oil volume ratio 100–5000, preferably 200–1000.

The catalyst of the present invention possesses excellent nitrogen resistant stability, high desulfurization and denitrogenation activity as well as high activity of hydrogenation for aromatic compounds.

PREFERRED EMBODIMENTS OF THE INVENTION

The following examples will further explain the present invention, but are not going to limit the present invention.

In the following examples and reference examples, hydrated alumina A, hydrated alumina B, and hydrated alumina C are respectively used, wherein hydrated alumina A is prepared according to the process disclosed in Chinese patent No. CN 85100218B. The specific preparing process reads as follows:

5588 grams of isopropyl alcohol containing 13.2 wt % water are added to an reactor equipped with a stirrer and a reflux condenser, and heated to boiling, the 2941 grams of molten aluminum isopropoxide are added dropwise thereto. After refluxing of 6 hours, 3555 grams of isopropyl alcohol containing 0.2 wt % water are evaporated out and then to the reactor 8.8 liters of deionized water are added for aging at 80 . for 16 hours, at the same time as of being aged, the water-containing isopropyl alcohol is evaporated out and the solid product obtained is dried at 120° C. to obtain hydrated alumina A.

Hydrated alumina B is a commercial product manufactured by the sodium meta-aluminate-carbon dioxide process, produced by Shangtong Province Aluminum Factory China under the product designation of "dried pseudo-boehmite".

Hydrated alumina C is a commercial product produced by Condea Company, Germany with the tradename "SB".

Table 1 gives out the content of boehmite of the above hydrated alumina as well as acidity strength value, the specific surface area and the pore volume of te al a obtained by calcining hydrated alumina for 4 hours at 550–600° C. as well as 650° C. The specific surface area and the pore volume are determined by BET method of nitrogen adsorption at low temperature.

In the following examples and reference examples, hydrogen form Y-type zeolite (Y), rare earth form Y-type zeolite (REY) and hydrogen form mordenite (HM) are respectively used.

Table 2 gives out the silica to alumina ratio, the acidity-strength value, and the rare earth oxide content of the above zeolites. Among them, the rare earth oxide content is determined by X-ray fluorescent spoctrometry (refer to "Petrochemical Analysis Methods (RIPP Test Methods)", p.p. 368–370, Science Press, 1990).

TABLE 1

| | | Hydrated alumina | | | | | | |
|---|---|---|---|---|---|---|---|---|
| hydrated alumina | No. content of boehmite (wt %) | A 68 | | | B 62 | | | C 78 |
| alumina | calcining temperature (°C.) | 550 | 600 | 650 | 550 | 600 | 650 | 600 |
| | acidity strength value (mmol/g) | 0.7156 | 0.7028 | 0.6760 | 0.6700 | 0.6565 | 0.6214 | 0.9306 |
| | specific surface area (m$^2$/g) | 268 | 252 | 240 | 292 | 278 | 265 | 219 |
| | pore volume (ml/g) | 0.61 | 0.61 | 0.60 | 0.41 | 0.40 | 0.40 | 0.50 |

TABLE 2

| | Zeolite | | |
|---|---|---|---|
| zeolite type | HY | REY | HM |
| SiO$_2$/Al$_2$O$_3$ | 4.8 | 4.8 | 7.4 |
| acidity strength value (mmol/g) | 1.5672 | 1.2365 | 1.8562 |
| rare earth oxide content(wt %) | 0 | 3.8 | 0 |

EXAMPLES 1–7

These examples relate to the preparation of die catalyst of the present invention.

(1) Preparation of the catalyst carrier

Predetermined amounts of hydrated alumina A and hydrated alumina B are mixed homogeneously with a predetermined amount of hydrogen form Y-type zeolite (HY), rare earth form Y-type zeolite (REY) and hydrogen form mordenite (HM) respectively. Then adequate amounts of extruding aid, binding agent and water are added thereto. The mixture obtained is then extruded into trilobular bars of a circumscribed circle diameter of 1.8 mm which are then dried and calcined.

Table 3 gives out the amounts of the starting materials as well as the calcining temperature and time duration in the preparing procedures of the catalyst carrier.

(2) Loading of fluorine

A predetermined amount of the above carrier is impregnated with aqueous solution of ammonium fluoride for 1 hour, and calcined after being dried at 120° C.

Table 4 gives out the amount of the carrier, the amounts of ammonium fluoride as well as the calcining temperature and time duration.

(3) Impregnation of nickel-tungsten

A predetermined amount of ammonium meta-tungstenate and nickel nitrate aqueous solution is used to impregnate the above-said fluorine-containing carrier for 4 hours.

The catalyst provided by the present invention is readily obtained after being dried at 120° C. and calcined.

Table 5 gives out the amounts of ammonium meta-tungstate and nickel nitrate as well as the calcining temperature and time duration.

Table 6 gives out the contents of the various active components in the catlyst manufactured, wherein the contents of NiO and $WO_3$ are determined using plasma emission spectrometry (ICP(AES) (refer to "Petrochemical Analysis Methods (RIPP Test Methods)" p.p. 360–361, Science Press, 1990), and the content of fluorine is determined using fluorine ion electrode (refer to the same book p.p. 185–187).

The catalysts manufactured by Examples 1–7 are respectively referred to as catalysts 1–7.

REFERENCE EXAMPLE 1

A catalyst is manufactured using the same process as described in examples 1–7 with the exception that hydrated alumina C is used to prepare tie catalyst carrier.

The amounts of the various starting materials used as well as the calcining temperature and time duration in the preparing procedures of the catalyst, the contents of the active components of the catalyst manufactured (referred to as catalyst 8) are respectively listed in Tables 3–6. The determination method of the acidity strength value and the contents of NiO, $WO_3$ as well as fluorine are the same as those of examples 1–7.

TABLE 4

Impregnation of fluorine

| | | impregnation of fluorine | | calcining conditions | |
|---|---|---|---|---|---|
| Example No. | carrier amount (g) | ammonium fluoride amount (g) | water amount (ml) | temperature (°C.) | time (hour) |
| Example 1 | 100 | 1.5 | 200 | 420 | 4 |
| Example 2 | 100 | 5.5 | 200 | 450 | 4 |
| Example 3 | 100 | 13.1 | 200 | 450 | 4 |
| Example 4 | 100 | 4.1 | 200 | 450 | 4 |
| Example 5 | 100 | 4.4 | 200 | 450 | 4 |
| Example 6 | 100 | 6.4 | 200 | 450 | 4 |
| Example 7 | 100 | 1.5 | 200 | 450 | 4 |
| Reference example 1 | 100 | 6.1 | 200 | 450 | 4 |

TABLE 5

Impregnation of nickel-tungsten

| | nickel-tungsen impregnation | | | calcining conditions | |
|---|---|---|---|---|---|
| Example No. | nickel nitrate amount (g) | ammonium meta-tungstate amount (g) | water amount (ml) | temperature (°C.) | time (hour) |
| Example 1 | 43.1 | 72.5 | 250 | 420 | 4 |
| Example 2 | 65.4 | 163.0 | 250 | 450 | 4 |
| Example 3 | 55.8 | 126.8 | 250 | 450 | 4 |
| Example 4 | 87.7 | 220.2 | 250 | 450 | 4 |

TABLE 3

Preparation of catalyst carrier

| | hydrated alumina | | zeolite | | calcining conditions | |
|---|---|---|---|---|---|---|
| Example No. | type | amount *(g) | type | amount* (g) | temperature (°C.) | time (hour) |
| Example 1 | hydrated alumina A | 75 | Zeolite HY | 25 | 500 | 4 |
| Example 2 | hydrated alumina A | 75 | Zeolite HY | 25 | 600 | 4 |
| Example 3 | hydrated alumina A | 75 | Zeolite HY | 25 | 650 | 4 |
| Example 4 | hydrated alumina A | 60 | Zeolite HY | 40 | 600 | 4 |
| Example 5 | hydrated alumina A | 75 | Zeolite REY | 25 | 600 | 4 |
| Example 6 | hydrated alumina B | 75 | Zeolite HY | 25 | 600 | 4 |
| Example 7 | hydrated alumina B | 65 | Zeolite HM | 35 | 600 | 4 |
| Reference example 1 | hydrated alumina C | 75 | Zeolite HY | 25 | 600 | 4 |

*The amounts of hydrated alumina and zeolite are given on dry basis.

TABLE 5-continued

Impregnation of nickel-tungsten

| Example No. | nickel-tungsen impregnation | | | calcining conditions | |
|---|---|---|---|---|---|
| | nickel nitrate amount (g) | ammonium meta-tungstate amount (g) | water amount (ml) | temperature (°C.) | time (hour) |
| Example 5 | 71.8 | 170.2 | 250 | 450 | 4 |
| Example 6 | 73.4 | 150.7 | 250 | 450 | 4 |
| Example 7 | 44.7 | 180.4 | 250 | 450 | 4 |
| Reference example 1 | 70.2 | 166.6 | 250 | 450 | 4 |

TABLE 6

Contents of active components of catalyst

| Example No. | catalyst No. | catalyst active components contents (wt %) | | |
|---|---|---|---|---|
| | | F | NiO | WO$_3$ |
| Example 1 | Catalyst 1 | 0.5 | 2.7 | 10.0 |
| Example 2 | Catalyst 2 | 1.9 | 4.1 | 22.5 |
| Example 3 | Catalyst 3 | 4.5 | 3.5 | 17.5 |
| Example 4 | Catalyst 4 | 1.4 | 5.5 | 30.4 |
| Example 5 | Catalyst 5 | 1.5 | 4.5 | 23.5 |
| Example 6 | Catalyst 6 | 2.2 | 4.6 | 20.8 |
| Example 7 | Catalyst 7 | 0.5 | 2.8 | 24.9 |
| Reference example 1 | Catalyst 8 | 2.1 | 4.4 | 23.0 |

EXAMPLES 8–9

The following examples illustrate the nitrogen resistant stability of the catalyst of the present invention.

An evaluation is given to tile catalyst 2 and the catalyst 6 respectively which are obtained in Example 2 and Example 6 respectively using heptane containing 1000 ppm organic nitrogen (pyridine) as the starting material. The reaction is cared out on a small size fixed-bed reaction device, the filled amount of the catalyst is 2.0 grams. Before the reaction, the catalyst is pre-sulfided for 2 hours at 300° C. under hydrogen atmosphere using the solution of carbon disulfide in heptane with a concentration of 3 wt %. Then the starting material is introduced, and the reaction is carried out under the conditions of 360° C. 4.1 MPa, WHSV 3.4 h$^{-1}$, and hydrogen/heptane (volume) 4,000. After reaction for 3 hours, sample of product is being taken for gas chromatographic analys is. The chromatographic column is a 5 meter filing column and the thermal conductivity detector is used. The results obtained are listed in Table 7.

REFERENCE EXAMPLE 2

This reference example illustrates that the nitrogen resistant stability of the catalyst of the present invention is superior to that of the catalyst in the prior art.

The procedures described in Examples 8–9 are followed except that the catalyst 8 obtained in Reference example 1 is used.

The results of Table 7 show that with respect to the hydrocracking reaction of the nitrogen-containing heptane the active stability of the catalyst provided by the present invention is superior to that in the prior art.

TABLE 7

Conversion of heptane

| | | conversion (wt %) | |
|---|---|---|---|
| Example No. | catalyst No. | 3 hours | 20 hours |
| Example 8 | catalyst 2 | 40.5 | 40.1 |
| Example 9 | catalyst 6 | 39.2 | 38.7 |
| Reference Example 2 | catalyst 8 | 37.5 | 35.5 |

EXAMPLE 10

This example illustrates the hydrocracking performance of the catalyst of the present invention with respect to vacuum gas oils.

The vacuum gas oils having boiling range of 208–520° C. are used as the starting material to evaluate the hydrocracking performance of the catalyst 2 obtained in Example 2. The reaction is carried out in the 100 ml hydrocracking device, the amount of the catalyst is 100 ml catalyst with a length of 2–3 mm. Before reaction, the catalyst is pre-sulfided for 25 hours using the kerosene, containing 2 wt % carbon disulfide at 300° C., then the starting material is introduced, and the evaluation reaction is conducted under the conditions of 380° C., 6.4 MPa, hydrogen/oil volume ratio 800, and LHSV 1.0 h$^{-1}$. The results obtained are listed in Table 8. In said table, the sulfur content is determined by coulometric analysis, and the nitrogen content is determined by chemiluminescence method The selectivity refers to e selectivity of middle distillates having boiling range of 180–370 ° C.

REFERENCE EXAMPLE 3

This reference example illustrates that with respect to the vacuum gas oils being used as te starting material, the catalyst provided by the present invention has a better selectivity to middle distillates than that of the catalyst in the prior art.

The procedures described in Example 10 are followed except that the catalyst 8 obtained in Reference 1 is used.

The results of Table 8 show that the desulfurization and denitrogenation performances of catalyst 2 and catalyst 8 are approximate, but the selectivity of catalyst 2 with respect to middle distillates can reach 62 wt % while that of catalyst 8 is only 55 wt %. The former is 12.7% higher ta the latter.

TABLE 8

Hydrocracking of vacuum gas oils

| Example No. catalyst No. | | Example 10 catalyst 2 | Reference example 3 catalyst 8 |
|---|---|---|---|
| sulfur content (ppm) | starting material | 3600 | 3600 |
| | product | 20.3 | 19.6 |
| desulfurization rate (%) | | 99.4 | 99.5 |
| nitrogen content (ppm) | starting material | 810 | 810 |
| | product | 0.5 | 0.5 |
| denitrogenation rate (%) | | 99.9 | 99.9 |
| selectivity (wt %) | | 62 | 55 |

EXAMPLE 11

This example illustrates the hydrocracking performance of the catalyst of the present invention with respect to the atmospheric gas oils.

The atmospheric gas oils having boiling range of 180–350° C. are used as the starting material to evaluate the hydrocracking performance of the catalyst 6 obtained in Example 6. Reaction device, filled amount of the catalyst as well as the catalyst pre-sulfidation procedure are the same as those of Example 10. Reaction conditions read: 360° C., 6.4 MPa, LHSV 2.0h$^{-1}$ hydrogen/oil volume ratio 500, The evaluation results are listed in Table 9.

REFERENCE EXAMPLE 4

This reference example illustrates that when the atmospheric gas oils are used as the starting material the catalyst of the present invention has a better selectivity with respect to middle distillates than the catalyst in the prior art.

The procedures described in Example 11 are followed except that the catalyst 8 obtained in Reference example 1 is used.

The results of Table 9 show that the desulfurization and denitrogenation performances of catalyst 6 provided by tie present invention and catalyst 8 are approximate, but the selectivity with respect to middle distillates of the former is 16.2% higher than that of the latter.

TABLE 9

Hydrocraking of atmospheric gas oils

| Example No.<br>catalyst No. | | Example 11<br>catalyst 6 | Reference<br>example 4<br>catalyst 8 |
|---|---|---|---|
| sulfur content | starting material | 1800 | 1800 |
| (ppm) | product | 15 | 17 |
| desulfurization rate (%) | | 99.2 | 99.1 |
| nitrogen content | starting material | 133 | 133 |
| (ppm) | product | 0.5 | 0.3 |
| denitrogenation rate (%) | | 99.6 | 99.7 |
| selectivity (wt %) | | 79 | 68 |
| BMCI | starting material | 20.79 | 20.79 |
| | middle distillates<br>product | 13.93 | 13.87 |

We claim:

1. In a hydrocracking catalyst containing nickel, tungsten, fluorine, zeolite as well as alumina, the improvement wherein said catalyst consists essentially of, based on the total weight of the catalyst, 0.5–5.0 weight percent fluorine, 2.5–6.0 weight percent nickel oxide, 10–38 weight percent tungsten oxide and a carrier; said carrier consisting of 20–90 weight percent alumina and 10–80 weight percent zeolite, wherein the zeolite is a mesopore or macropore zeolite with an acidity strength value of 1.0–2.0 mmol/g determined by NH$_3$-TPD, and the alumina is alumina having an acidity strength value of 0.5–0.8 mmol/g determined by NH$_3$-TPD.

2. A catalyst according to claim 1, wherein the catalyst contains 1–4 wt % fluorine, 2.6–5.0 wt % nickel oxide, and 19–25 wt % tungsten oxide.

3. A catalyst according to claim 1, wherein the catalyst carrier is composed of 50–80 wt % alumina and 20–50 wt % zeolite.

4. A catalyst according to any one of claim 1, wherein said zeolite is selected from the group consisting of faujasite, mordenite, ZSM-5 zeolite, Beta zeolite and Ω zeolite, and the mixture thereof.

5. A catalyst according to claim 4, wherein said zeolite is selected from the group consisting of hydrogen form Y-type zeolite, rare earth form Y-type zeolite, and mordenite.

6. A catalyst according to any one of claims 1, wherein said alumina is obtained by calcining one or more kinds of hydrated alumina prepared by a process selected from sodium meta-aluminate-carbon dioxide process, alkyl aluminum or alkoxy aluminum hydrolysis process, and sodium meta-aluminate-aluminum sulfate process.

7. A catalyst according to claim 6, wherein said hydrated alumina contains more than 60 wt % boehmite.

8. A process for the preparation of the catalyst claimed in claim 1, said process comprising mixing homogeneously hydrated alumina and zeolite, shaping, drying and calcining to obtain the carrier, and then sequentially impregnating the carrier with fluorine-containing aqueous solution and nickel-tungsten-containing aqueous solution, and drying and calcining after each impregnation, wherein said hydrated alumina is selected such that, after the hydrated alumina is calcined at 500–650° C., the alumina of the acidity strength value 0.5–0.8 mmol/g determined by NH$_3$-TPD is formed, said zeolite being mesopore or macropore zeolite of the acidity strength value 1.0–2.0 mmol/g determined by NH$_3$-TPD.

9. A process according to claim 8, wherein said hydrated alumina is one or more kinds of hydrated alumina prepared by a process selected from sodium meta-aluminate-carbon dioxide process, alkyl aluminum or alkoxy aluminum hydrolysis process, and sodium meta-aluminate-aluminum sulfate process.

10. A process according to claim 9, wherein said hydrated alumina contains more than 60% boehmite.

11. A process according to claim 8, wherein said zeolite is selected from the group consisting of faujasite, mordenite, ZSM-5 zeolite, Beta zeolite and Ω zeolite, and the mixture thereof.

12. A process according to claim 11, wherein said zeolite is selected from hydrogen form Y-type zeolite rare earth form Y-type zeolite, and mordenite.

* * * * *